June 15, 1965 E. J. MULLARKEY Re. 25,800

WEIGHT BALANCING ARRANGEMENT

Original Filed Oct. 2, 1957

INVENTOR
EDWARD J. MULLARKEY
BY
Curtis, Morris & Safford
ATTORNEYS

United States Patent Office

Re. 25,800
Reissued June 15, 1965

25,800

WEIGHT BALANCING ARRANGEMENT

Edward J. Mullarkey, 141 Boulevard, Scarsdale, N.Y.

Original No. 2,945,398, dated July 19, 1960, Ser. No. 687,833, Oct. 2, 1957. Application for reissue Mar. 29, 1961, Ser. No. 101,036
6 Claims. (Cl. 74—573)

Matter enclosed in heavy brackets [ ] appears in the original patent but forms no part of this reissue specification; matter printed in italics indicates the additions made by reissue.

This invention relates to an improved arrangement for balancing a weight or body, and in a specific application the invention is useful in shifting or trimming the center of gravity of a body with extreme precision.

An object of this invention is to provide a way of very easily and accurately shifting the balance of a body.

Another object is to provide an arrangement for balancing a body which permits the body to be balanced and re-balanced under actual operating conditions or after final assembly.

A more specific object is to provide a very simple and inexpensive counter-poise element or cell which can be permanently incorporated in a body and which can be operated externally by electric current to precisely balance the body after final assembly or during actual operation.

These and other objects will in part be understood from and in part pointed out in the description given hereinafter.

To accurately balance the weight of a body or to shift its center of gravity to a new position is a problem encountered in numerous applications. The balancing of the rotor of an electric motor is a good example of how tedious and difficult this operation can be. In the past it has been the usual practice to take the rotor, apart from the other elements of the motor, and by a trial and error procedure to remove from the rotor by drilling, for example, a little at a time and from different points sufficient material to achieve acceptable balance. Obviously, though, this way of balancing is at best only approximate and, moreover, it is effectively irreversible. The metal which has been removed from the rotor cannot, as a practical matter, be put back.

In other instances, as with precision indicating instruments, small mechanical sliders or weights such as screws, have been used to obtain balance. Again, though, the adjustment of these weights is a cut and try procedure and is difficult to carry out when the instruments are in actual operation.

Though more nearly automatic ways than those described above for balancing a body have previously been devised they have been, so far as is known, much too complicated, expensive or cumbersome to be of real value. Hence, up to the present time the more rudimentary arrangements for balancing a body are still primarily the ones in use. The present invention it is believed will greatly change this situation by providing a very simple and inexpensive electrically controlled arrangement for balancing a body.

In accordance with the present invention there is provided as a weight a balancing device an electrolytic cell which functions as an entirely closed system and whose balancing action is reversible at will simply by changing the direction of current through the cells. In one specific embodiment of the cell it has a pencil or needle-like shape with an electrode at each end in contact with a suitable electrolyte liquid in the space between the electrodes. When a current is passed in one direction through the cell, metal is plated on one electrode and removed from the other thereby shifting the center of gravity of the cell.

Thus atoms of the metal electrodes can be shifted almost one-by-one from one end of the cell to the other and a phenomenally fine degree of balance is achieved. In the event that too much metal in the cell is shifted, the current can be reversed until exact balance is obtained.

In the specific embodiment of the balance cell described herein, the wall of the cell is constructed so that it can expand and contract slightly with changing temperature without causing voids in the electrolyte or creating excessive pressure. The described method of fabrication of the cell lends itself to assembly line manufacturing and yet insures low cost and high quality. Because this cell can be made in very small size and because it is inexpensive to manufacture and extremely easy to use, it is useful in many applications where previously only small screws and similar purely mechanical weights could commercially be used.

A better understanding of the invention together with a fuller appreciation of its many advantages will best be gained from the following description given in connection with the accompanying drawings wherein.

Figure 1:
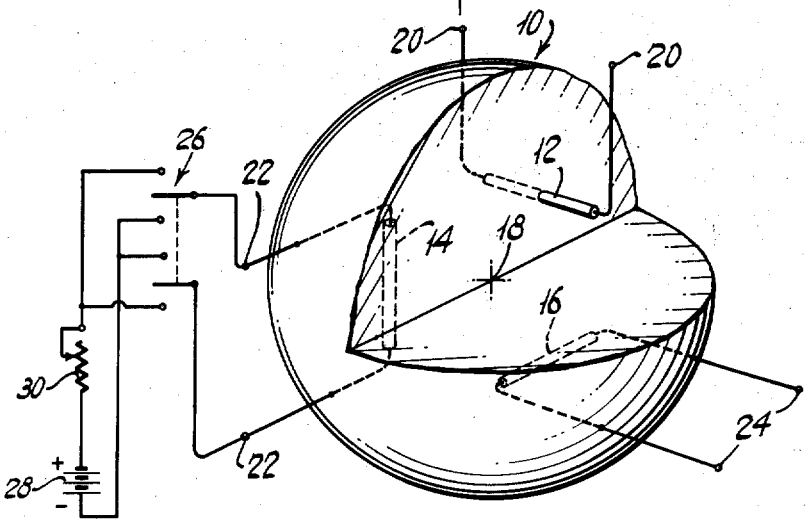
FIGURE 1 is an illustration of a body to be balanced and showing it partially broken away in combination with three orthogonally positioned and symmetrically disposed pencil-like cells provided according to the invention, the cells being embedded in the body.

As seen in FIGURE 1, a body 10 to be balanced, here represented as a solid sphere, is provided with three pencil-like cells 12, 14 and 16 embedded within it and whose individual centers of gravity can be shifted independently along three separate axes, for example, the x, y and z axes. The resultant shift in the weight of these cells can thus shift the center of gravity 18 of body 10 in any direction within a given limit of distance.

Each cell 12, 14 and 16 has connected to its two ends respective ones of the pairs of electric wires 20, 22 and 24. Each pair of wires is adapted to be connected selectively through the double-pole double-throw switch 26 to the battery 28. The current from the battery is regulated in amount by the rheostat 30 and can be made to flow in either direction through a cell depending upon the setting of switch 26. When balance or the desired degree of shifting of the center of gravity of body 10 has been obtained, the battery and switch can be removed.

Figure 2:
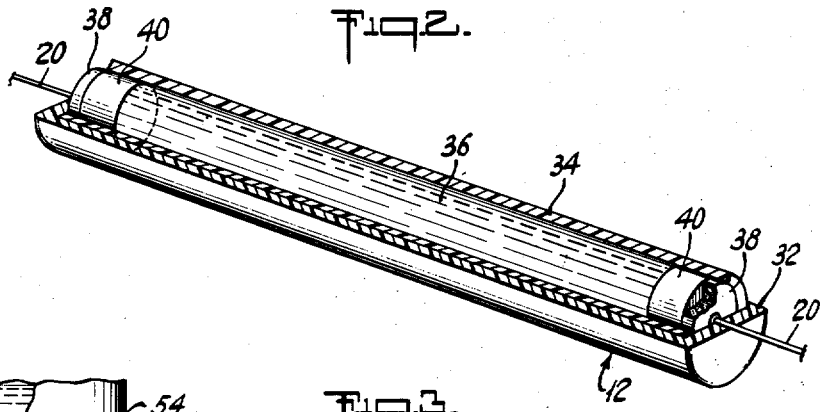
FIGURE 2 is a greatly enlarged cell, such as shown in FIGURE 1, embodying features of the invention.

FIGURE 2 shows partly in section and greatly enlarged one of the cells, cell 12, illustrated in FIGURE 1, the other cells being identical. Cell 12 comprises an outer cylindrical housing 32 of a rigid material, such as transparent Lucite, which totally encloses an inner shell 34 of a suitable elastomer, such as foamed vinylite or urethane. The wall of this inner shell is inert, electrically insulating, compressible, and is liquid impervious. Centrally contained within this shell is a quantity of a liquid electrolyte solution 36. The two ends of the shells are sealed by the discs 38 made of the same material as the shell but loaded with metal particles of sub-micron size, such as powdered copper, to make the discs electrically conductive. Connected to the outer faces of these discs are wires 20 which are securely anchored in the ends of housing 32.

Plated or formed on the inner faces of discs 38 are the metal slugs or cylinders 40 which also are in intimate contact with the electrolyte 36. By passing a suitable direct current through the electrolyte in one direction the metal slug at one end of the cell will be built up and the slug at the other end will be gradually removed. Thus the center of gravity of the cell can be shifted along its length practically atom by atom and a phenomenally fine degree of balance is obtained. As was explained before, by simply reversing the direction of current through the electrolyte the balance can be shifted in the opposite direction.

The walls of shell 34, which are elastic, are maintained under slight compression by housing 32 so that the electrolyte is kept under slight pressure. This permits the volume occupied by the electrolyte, or the inside dimensions of the cell to change slightly without creating a void in the electrolyte or conversely causing undue pressure. Since in some cases the plastics used for shell 34 and housing 32 are pervious to gas, this pressure on the electrolyte will inhibit the inward diffusion through the shell and housing of gases which may be harmful to the electrolyte.

Figure 3:
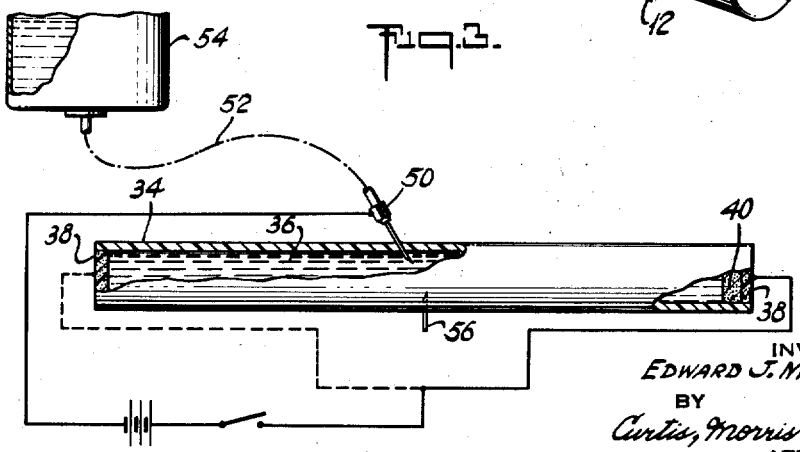
FIGURE 3 illustrates a process for manufacturing such a cell.

FIGURE 3 illustrates a very desirable way of fabricating cell 12. Elastic shell 34 with end discs 38 fused or otherwise sealed in place is filled with electrolyte by means of a hypodermic needle 50 of a noble metal inserted through the shell and connected via a tube 52 to a tank 54 containing a supply of the electrolyte. A hollow, inert drain needle 56 also piercing shell 34 permits the electrolyte to be flushed continuously through the shell and any trapped gas to escape.

After the shell is completely filled with electrolyte, an electric current is passed through the electrolyte, being applied by wires 58 and 59 through needle 50 and a disc 38, to build up on the disc an electrolytically pure slug of metal, such as copper, which comprises one of the cylinders 40. This step is then repeated for the other disc 38 and afterward fresh electrolyte is injected into the sleeve and the exhausted electrolyte drained off. Finally the needles 50 and 56 are removed and the elastic shell encased in a suitable rigid housing which maintains it under compression.

Electrolyte 36 is advantageously a 25% aqueous copper sulfate solution by volume to which is added one drop of concentrated sulfuric acid and which has been deoxygenated. The maximum voltage applied to a cell should be kept to a value less than the gas evolution potential of that particular cell. *This means that in normal use of the cell no gas will be evolved by the electrolyte. As mentioned above, the appearance of a void or gas in the electrolyte is undesirable.*

The above description is intended in illustration and not in limitation of the invention. Various changes or modifications may occur to those skilled in the art and these can be made without departing from the spirit or scope of the invention as set forth.

I claim:

1. An arrangement for precisely balancing a body comprising in combination: a body having a center of gravity, and means carried by said body to shift said center of gravity comprising a totally enclosed chamber having walls which are electrically insulating and liquid proof, a quantity of liquid electrolyte within said chamber, two spaced metal electrodes in said chamber in intimate contact with said electrolyte, said electrolyte being free of voids between said electrodes, means including conductive members for applying an electric current through said electrolyte to alter the relative weights of said electrodes and thereby shift the center of gravity of said body, and resilient means to permit said electrolyte and said housing to expand and contract without creating voids in the electrolyte.

2. A weight balancing arrangement of the character described comprising a shell having compressible walls of an inert, liquid impervious, electrically insulating elastomer material, a liquid electrolyte filling said shell, two spaced metal electrodes within said shell in contact with said electrolyte, a rigid body surrounding said shell and maintaining it under pressure, and means coupled to said electrodes for applying from an external source a current through said cell to alter the relative weights of said electrodes and thereby shift the center of gravity of said body.

3. The arrangement as in claim 2 wherein said shell is a long, thin hollow cylinder having needle-like shape.

4. A weight balancing cell comprising a hollow shell having walls of a compressible, inert, electrically insulating material, two spaced metal electrodes positioned within said shell, a liquid electrolyte filling said shell without voids and in contact with both of said electrodes, a rigid housing surrounding said shell and maintaining it under pressure, and means for coupling to said electrodes an external source to pass a current through said electrolyte in either direction to alter the relative weights of said electrodes.

5. The structure as in claim 4 wherein said electrolyte is copper sulfate solution and said electrodes are slugs of pure copper.

6. The process of fabricating a weight balancing cell of the character described comprising: taking a compressible container for an electrolyte solution, placing in it two spaced electrodes, filling the container with electrolyte, electro-plating from the electrolyte onto each electrode a slug of metal, draining from the container the used electrolyte, and refilling with fresh electrolyte, and then permanently sealing the container in a surrounding housing which maintains it under slight compression.

References Cited by the Examiner

The following references, cited by the Examiner, are of record in the patented file of this patent or the original patent.

UNITED STATES PATENTS

| | | | |
|---|---|---|---|
| Re. 24,190 | 7/56 | Kroko. | |
| 2,013,675 | 9/35 | Steerup | 204—242 X |
| 2,859,626 | 11/58 | Maze | 74—574 X |

FOREIGN PATENTS

| | | |
|---|---|---|
| 8,391 | 1905 | Great Britain. |

DON A. WAITE, *Primary Examiner.*

BROUGHTON G. DURHAM, *Examiner.*